US010302867B1

(12) United States Patent
Goutzoulis et al.

(10) Patent No.: US 10,302,867 B1
(45) Date of Patent: May 28, 2019

(54) REDIRECTED OPTICAL MODULATOR OUTPUT

(71) Applicants: Anastasios Goutzoulis, Annapolis, MD (US); Mario J. Venetos, Bel Air, MD (US)

(72) Inventors: Anastasios Goutzoulis, Annapolis, MD (US); Mario J. Venetos, Bel Air, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/945,929

(22) Filed: Apr. 5, 2018

(51) Int. Cl.
*H04B 10/00* (2013.01)
*G02B 6/293* (2006.01)
*H04B 10/516* (2013.01)
*G02B 6/27* (2006.01)
*H04B 10/60* (2013.01)

(52) U.S. Cl.
CPC ....... *G02B 6/29398* (2013.01); *G02B 6/2706* (2013.01); *G02B 6/2746* (2013.01); *G02B 6/2938* (2013.01); *G02B 6/29302* (2013.01); *H04B 10/516* (2013.01); *H04B 10/60* (2013.01)

(58) Field of Classification Search
CPC .... H04B 10/516; H04B 10/60; H04B 10/505; H04B 10/00; H04B 10/503; H04B 10/532; H04B 10/54; H04B 10/50; H04B 10/70; H04B 10/40; H04B 10/2569; G02B 6/29398; G02B 6/2706; G02B 6/2746; G02B 6/29302; G02B 6/2938; G02B 6/12004; G02B 6/2713; G02B 6/4246; H04J 14/06

USPC ....... 398/140, 152, 182, 183, 184, 186, 188, 398/135, 139, 141
See application file for complete search history.

(56) References Cited

U.S. PATENT DOCUMENTS

| 4,463,329 | A | | 7/1984 | Suzuki |
| 4,505,542 | A | | 3/1985 | Clarke |
| 4,524,385 | A | | 6/1985 | Billingsley et al. |
| 4,904,882 | A | | 2/1990 | Szu |
| 4,943,556 | A | | 7/1990 | Szu |
| 5,247,183 | A | * | 9/1993 | Tocci ....................... H04N 5/33 250/238 |

(Continued)

FOREIGN PATENT DOCUMENTS

WO 99/06777 2/1999

*Primary Examiner* — Hibret A Woldekidan
(74) *Attorney, Agent, or Firm* — Tarolli, Sundheim, Covell & Tummino LLP

(57) ABSTRACT

In an example, a system comprises a first optical device, a second optical device, and an optical modulator. The first optical device, in a non-cryogenic environment, receives a light signal, outputs the light signal, receives a first modulated light signal, and outputs the first modulated light signal into the non-cryogenic environment. The second optical device, in a cryogenic environment, receives the light signal from the first optical device, outputs the light signal, receives the first modulated light signal, and outputs the first modulated light signal. The optical modulator, in the cryogenic environment, receives the light signal from the second optical device, modulates the light signal to produce the first modulated light signal and a second modulated light signal, outputs the second modulated light signal, and outputs the first modulated light signal to the second optical device.

20 Claims, 5 Drawing Sheets

(56) References Cited

U.S. PATENT DOCUMENTS

| | | | | |
|---|---|---|---|---|
| 8,829,471 B1* | 9/2014 | Merkel | ............... | G03H 1/0005 |
| | | | | 250/458.1 |
| 9,880,365 B2* | 1/2018 | Goutzoulis | ............ | G02B 6/325 |
| 10,097,281 B1* | 10/2018 | Vernik | .................. | H04B 10/80 |
| 10,192,168 B2* | 1/2019 | Rigetti | .................... | G06F 13/36 |
| 2004/0208614 A1* | 10/2004 | Price | .................... | H04B 10/505 |
| | | | | 398/152 |
| 2007/0001773 A1* | 1/2007 | Oxborrow | ................ | H01P 7/10 |
| | | | | 331/154 |
| 2008/0252853 A1* | 10/2008 | Yao | ..................... | G02B 3/0056 |
| | | | | 353/20 |
| 2012/0213236 A1* | 8/2012 | Lundquist | ............. | H01S 3/0604 |
| | | | | 372/25 |
| 2013/0087693 A1* | 4/2013 | Woodward | ............... | G01J 1/42 |
| | | | | 250/227.11 |
| 2015/0332829 A1 | 11/2015 | Stautner et al. | | |
| 2016/0033597 A1 | 2/2016 | Gong | | |
| 2016/0292587 A1* | 10/2016 | Rigetti | .................... | G06F 13/36 |
| 2017/0257074 A1* | 9/2017 | Yeh | ........................ | G06N 99/00 |
| 2017/0357061 A1 | 12/2017 | Shields et al. | | |
| 2018/0262276 A1* | 9/2018 | Bishop | .................. | G06N 10/00 |

* cited by examiner

US 10,302,867 B1

REDIRECTED OPTICAL MODULATOR OUTPUT

TECHNICAL FIELD

The disclosure relates generally to an optical modulator, and more particularly to a redirected optical modulator output.

BACKGROUND

Cryogenic computing is a form of computing in which processing components are located within a cryogenic environment, e.g., 4-77 K. Such a cryogenic environment allows such processing components to operate with superconducting components that include, e.g., zero-resistance wires, ultrafast Josephson junction switches, fluxoids, etc. Fiber optics are one medium for moving data to/from a cryogenic computer. Such fiber optics can provide a fast, e.g., 10-100 Gbps, digital communication link(s) to/from the cryogenic environment and a non-cryogenic environment, e.g., a room temperature environment (e.g. 300 K). Moreover, for application to ultra-low power cryogenic systems, use of certain modulators is limited in that some modulators generate relatively large amount of heat that negatively impacts the cryogenic environment.

SUMMARY

In an example, a system includes a first optical device, a second optical device, and an optical modulator. The first optical device, in a non-cryogenic environment, receives a light signal, outputs the light signal, receives a first modulated light signal, and outputs the first modulated light signal into the non-cryogenic environment. The second optical device, in a cryogenic environment, receives the light signal from the first optical device, outputs the light signal, receives the first modulated light signal, and outputs the first modulated light signal. The optical modulator, in the cryogenic environment, receives the light signal from the second optical device, modulates the light signal to produce the first modulated light signal and a second modulated light signal, outputs the second modulated light signal, and outputs the first modulated light signal to the second optical device.

In another example, a method is provided. The method includes outputting, from a first optical device in a non-cryogenic environment, a light signal to a second optical device in a cryogenic environment and outputting, from the second optical device, the light signal to an optical modulator in the cryogenic environment. The method further includes modulating, with the optical modulator, the light signal to produce a first modulated light signal and a second modulated light signal and outputting, from the optical modulator, the second modulated light signal. The method yet further includes outputting, from the optical modulator, the first modulated light signal to the second optical device and outputting, from the second optical device, the first modulated light signal to the first optical device. The method even further includes outputting, from the first optical device, the first modulated light signal into the non-cryogenic environment.

In yet another example, a system includes a first optical polarization beam splitter and combiner, a second optical polarization beam splitter and combiner, a 1×2 directional coupler modulator, and a waveguide. The first optical polarization beam splitter and combiner, in a non-cryogenic environment, receives a light signal, outputs the light signal, receives a first modulated light signal, and outputs the first modulated light signal into the non-cryogenic environment. The second optical polarization beam splitter and combiner, in a cryogenic environment, receives the light signal from the first optical device, outputs the light signal, receives the first modulated light signal, and outputs the first modulated light signal. The 1×2 directional coupler modulator, in the cryogenic environment, outputs a second modulated light signal and outputs a first modulated light signal to the second optical polarization beam splitter and combiner. The waveguide is coupled to the 1×2 directional coupler modulator to receive the first modulated light signal from the 1×2 directional coupler modulator.

DETAILED DESCRIPTION

Figure 1:
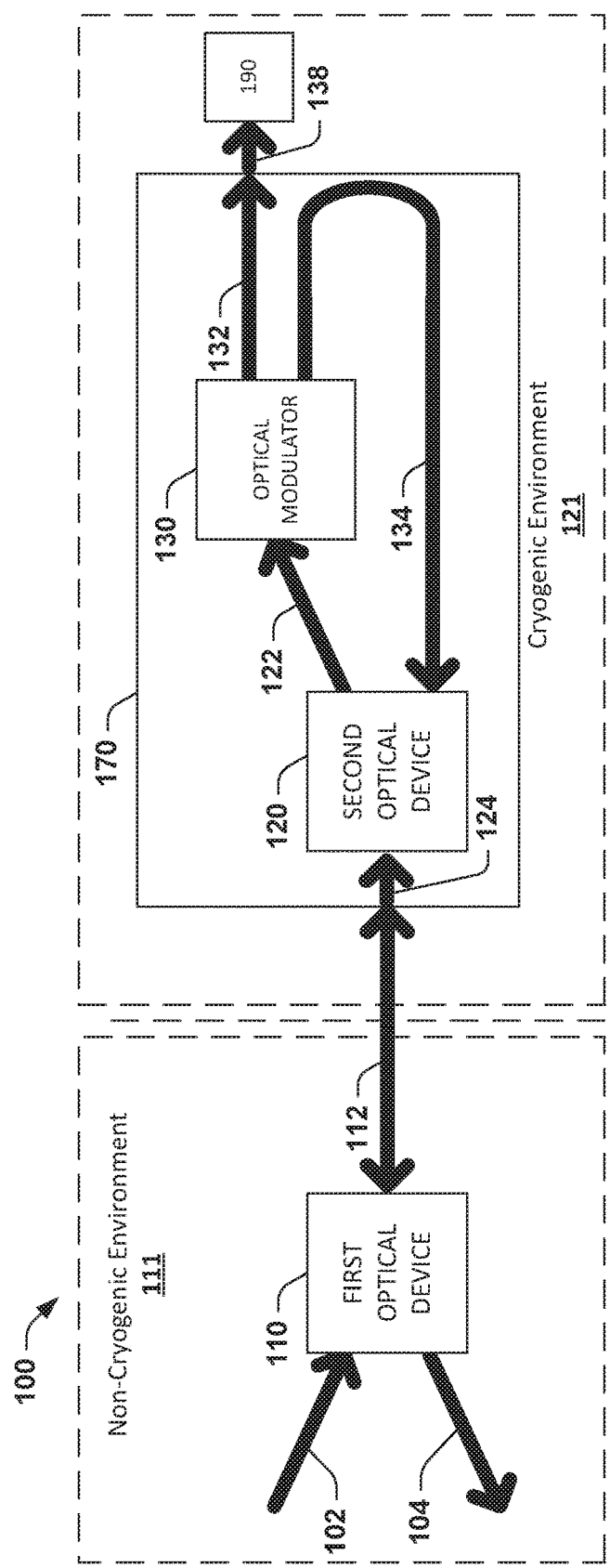
FIG. 1 illustrates an example system to redirect unused light from a cryogenic environment to a non-cryogenic environment.

To eliminate typical compensation for a temperature increase associated with the unused light signal within a cryogenic computing system, an example system disclosed herein redirects this unused light signal from the cryogenic environment to the non-cryogenic environment. Thus, this redirected output signal is not dissipated into the cryogenic environment. Such an example system includes a first optical device, in a non-cryogenic environment, to receive a light signal, output the light signal, receive a first modulated light signal, and output the first modulated light signal into the non-cryogenic environment. The system further includes a second optical device, in the cryogenic environment, to receive the light signal from the first optical device, output the light signal, receive the first modulated light signal, and output the first modulated light signal. The system yet further includes an optical modulator, in the cryogenic environment, to receive the light signal from the second optical device, modulate the light signal (e.g., with a superconducting electrical signal) to produce the first modulated light signal and a second modulated light signal, output the second modulated light signal, and output the first modulated light signal to the second optical device.

Some cryogenic computing systems employ optical modulators to modulate a light signal received within their cryogenic environment from a non-cryogenic environment. During their operation to modulate light signal, these optical modulators produce an output signal of unused light. Outputting such an unused light signal within the cryogenic environment raises the temperature of the cryogenic environment. This temperature increase is compensated for with increased cooling of the cryogenic environment. This temperature increase is compounded within the addition of more optical modulators, with some cryogenic computing systems employing numerous optical modulators, e.g., as much as a hundred or more, based on the amount of data being sent to a particular cryogenic computing system. The example system utilizes two optical devices to redirect the unused light signal, e.g., the first modulated light signal, from the cryogenic environment to the non-cryogenic environment. Outputting such an unused light signal into the non-cryogenic environment prevents the unused light signal from raising a temperature of the cryogenic environment and reduces an amount of cooling used to maintain a desired temperature within the cryogenic environment. The example system eliminates the need for a second fiber at the output of the second optical device and the associated complexity (e.g., mass, connectors, jackets, space, etc.), with the example system redirecting one of the two outputs from the optical modulator of the system without affecting the optical modulator's performance. Such redirection can be implemented with an integrated optical polarization beam splitter combiner (PBSC) located on a modulator chip or an integrated optical circulator located on a modulator chip.

FIG. 1 illustrates an example system 100 (e.g., ultra-low power electro-optic cryo-logic system) to redirect unused light from a cryogenic environment 121 (e.g., 4-77 K) to a non-cryogenic environment 111 such as a room temperature environment (e.g. 300 K). In an example, the cryogenic environment 121 is separated from the non-cryogenic environment 111 via an insulated barrier, e.g., an insulated wall, to facilitate maintaining the temperature within the cryogenic environment 121. The system 100 includes a first optical device 110 in the non-cryogenic environment 111. The first optical device 110 is coupled to a first optical fiber 102, a second optical fiber 112 (e.g., a polarization maintaining fiber), and a third optical fiber 104. The first optical device 110 receives a light signal on the first optical fiber 102 and outputs the light signal on the second optical fiber 112. The first optical device 110 further receives a first modulated light signal from the cryogenic environment 121 on the second optical fiber 112 and outputs the first modulated light signal into the non-cryogenic environment 111 on the third optical fiber 104. Thus, the second optical fiber 112 is a bi-directional path utilized to transport the light signal into the cryogenic environment 121 from the non-cryogenic environment 111, and the first modulated light signal into the non-cryogenic environment 111 from the cryogenic environment 121 to remove or dispose of unwanted and unused light from the cryogenic environment 121 into the non-cryogenic environment 111.

The system 100 further includes a modulator module 170 that is comprised of a second optical device 120 in the cryogenic environment 121. The second optical device 120 is coupled to the second optical fiber 112 via a first optical waveguide 124, and is further coupled to a second optical waveguide 122 and a third optical waveguide 134. The second optical device 120 receives the light signal from the first optical device 110 via the second optical fiber 112. The second optical device 120 outputs the light signal on the second optical waveguide 122. The second optical device 120 also receives the first modulated light signal via the third optical waveguide 134 and outputs the first modulated light signal on the second optical fiber 112 via the first optical waveguide 124.

The modulator module 170 further includes an optical modulator 130 (e.g., a 1×2 directional coupler modulator (1×2 DCM), a silicon micro resonator (SMR), or any other optical modulator that produces an output signal that can be redirected to the non-cryogenic environment 111) in the cryogenic environment 121. Thus, this redirected output signal is not dissipated into the cryogenic environment 121. The optical modulator 130 is coupled to the second optical waveguide 122, a third optical waveguide 134, and a fourth optical waveguide 132. The optical modulator 130 receives the light signal from the second optical device 120 via the second optical waveguide 122. The optical modulator 130 modulates this received light signal (e.g., with a superconducting electrical signal) to produce the first modulated light signal and a second modulated light signal. The optical modulator 130 outputs the second modulated light signal to a cryogenic device 190, e.g., a cryogenic computing system, within the cryogenic environment 121 that is coupled to the optical modulator 130 via the fourth optical waveguide 132. In another example, the cryogenic device 190 is part of a cryogenic system (not shown) that provides a communication path within the cryogenic environment 121 and/or conveys signals from within the cryogenic environment 121 to the non-cryogenic environment 111. The fourth optical waveguide 132 is coupled to a third optical fiber 138 to provide a data path between the optical modulator 130 and the cryogenic device 190 for the second modulated light signal. The optical modulator 130 also outputs the first modulated light signal to the second optical device 120 via the third optical waveguide 134. The optical modulator 130 provides two "pseudo-complimentary" optical outputs in which substantially no light is wasted into the substrate of the modulator module 170 and which can be read out via the fourth optical waveguide 132 and the third optical fiber 138.

Thus, the system 100 redirects one of the outputs of the optical modulator 130, the first modulated light signal on the third optical waveguide 134, from the cryogenic environment 121 into the non-cryogenic environment 111. In particular, the second optical device 120 receives the first modulated light signal and outputs the first modulated light signal on the second optical fiber 112 on which the first modulated light signal will pass to the non-cryogenic environment 111. Thereafter, the first optical device 110 outputs the first modulated light signal into the non-cryogenic environment 111 to prevent the first modulated light signal from increasing a temperature of the cryogenic environment 121. Moreover, the system 100 eliminates the need for a second fiber at the output of the second optical device 120 and the associated complexity (e.g., mass, connectors, space, etc.), with the example system 100 redirecting one of the two outputs from the optical modulator 130 of the system 100 without affecting performance of the optical modulator 130. Furthermore, the second optical device 120, the optical modulator 130, and their associated waveguides 122, 124, 132, and 134 are integrated onto a same substrate, resulting in a diminished loss of light as it moves between such components such that nearly all of the first modulated light signal can be redirected into the non-cryogenic environment 111.

Figure 2:
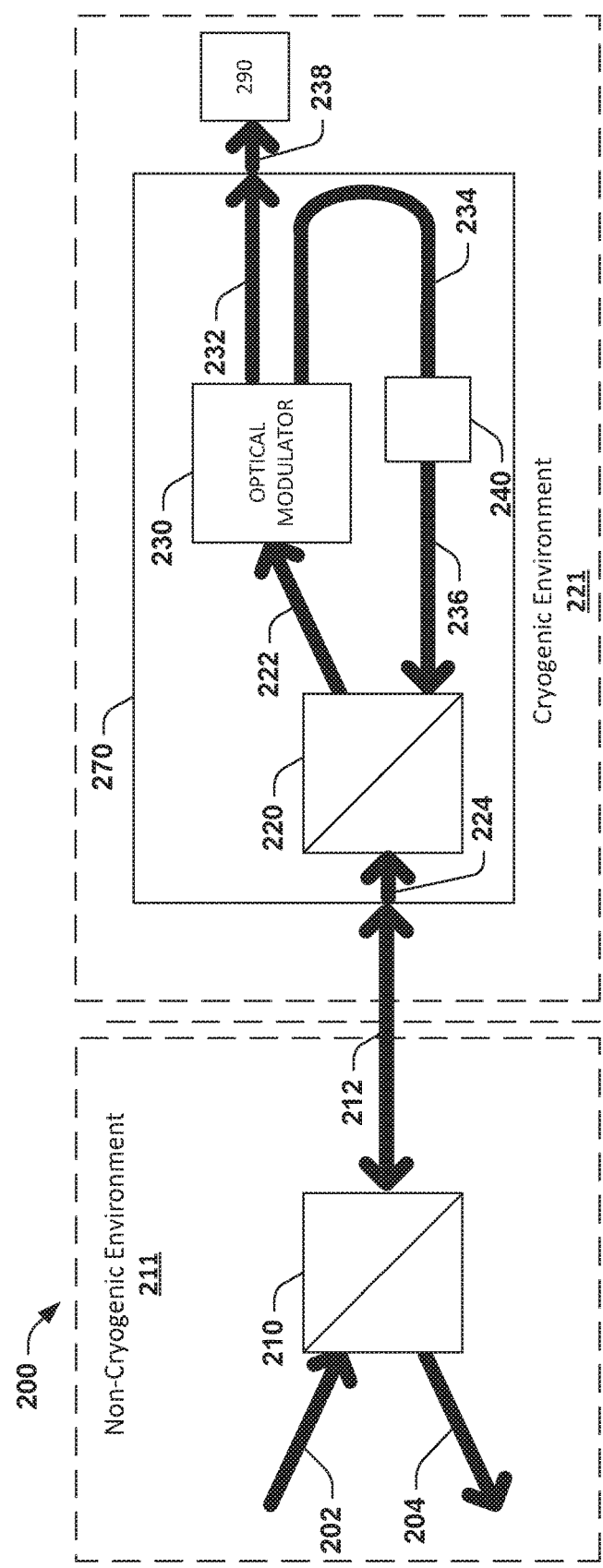
FIG. 2 illustrates another example system to redirect unused light from the cryogenic environment to the non-cryogenic environment.

FIG. 2 illustrates another example system 200 (e.g., ultra-low power electro-optic cryo-logic system) to redirect unused light from a cryogenic environment 221 to a non-cryogenic environment 211. The system 200 includes a first 1×2 directional coupler 210 (e.g., an on-chip integrated optical polarization beam splitter/combiner) in the non-cryogenic environment 211. The first 1×2 directional coupler 210 is coupled to a first optical fiber 202, a second optical fiber 212 (e.g., a polarization maintaining fiber), and a third optical fiber 204 (e.g., a fast axis). The first 1×2 directional coupler 210 receives a light signal on a slow axis of the first optical fiber 202 and outputs the light signal on the second optical fiber 212. The second optical fiber 212 is a polarization-maintaining (PM) fiber and carries polarized continuous wave (CW) light along its slow (e.g., horizontal) axis. The first 1×2 directional coupler 210 further receives a first modulated light signal on the second optical fiber 212 and outputs the first modulated light signal into the non-cryogenic environment 211 via the third optical fiber 204. Thus, the second optical fiber 212 is a bi-directional path utilized to transport the light signal into the cryogenic environment 221 from the non-cryogenic environment 211, and the first modulated light signal into the non-cryogenic environment 211 from the cryogenic environment 221, with the light signal being transported into the cryogenic environment 221 on a slow axis of the second optical fiber 212 and the first modulated light signal being transported on a fast axis of the second optical fiber 212.

In an example, the first optical fiber 202 is a slow axis light path and the third optical fiber 204 is a fast axis light path. However, depending upon optical properties, e.g., a reflective index of a birefringent material (e.g., silica, fluorozirconate, fluoroaluminate, chalcogenide glasses, sapphire, polystyrene, acrylic, or any other electro-optical material) of the first optical fiber 202 and the third optical fiber 204, in another example the first optical fiber 202 can be a fast axis light path and the third optical fiber 204 can be a slow axis light path. The second optical fiber 212 is both a slow axis light path and a fast axis light path, with the second optical fiber 212 providing the slow axis light path from the non-cryogenic environment 211 to the cryogenic environment 221 and providing the fast axis light path from the cryogenic environment 221 to the non-cryogenic environment 211. Likewise, in another example the second optical fiber 212 can provide a fast axis light path from the non-cryogenic environment 211 to the cryogenic environment 221 and can provide a slow axis light path from the cryogenic environment 221 to the non-cryogenic environment 211.

The system 200 further includes a modulator module 270 that is comprised of a second 1×2 bi-directional coupler 220 (e.g., an on-chip integrated optical polarization beam splitter/combiner) in the cryogenic environment 221. The second 1×2 bi-directional coupler 220 is coupled to the second optical fiber 212 via a first optical waveguide 224, and is further coupled to a second optical waveguide 222 and a fifth optical waveguide 236. In an example, the second optical waveguide 222 is a slow axis and the fifth optical waveguide 236 is a fast axis polarization waveguide. In another example, the second optical waveguide 222 is a slow axis and the fifth optical waveguide 236 is a slow axis polarization waveguide. The first and second 1×2 bi-directional coupler 210 and 220 act as polarization-based multiplexers/demultiplexers in that they are bi-directional devices and are used to concurrently split the light from an input fiber according to its polarization states (e.g., into vertical and horizontal) and combine two orthogonally-polarized beams into a single, dual polarization beam. In the example of FIG. 2 the first and second 1×2 bi-directional coupler 210 and 220 are polarized along a slow axis of the system 200 which lies along the horizontal direction.

The second 1×2 bi-directional coupler 220 receives the light signal from the first 1×2 bi-directional coupler 210 via the second optical fiber 212. The second 1×2 bi-directional coupler 220 outputs the light signal on a second optical waveguide 222. The second 1×2 bi-directional coupler 220 also receives the first modulated light signal via the fifth optical waveguide 236 and outputs the first modulated light signal on the second optical fiber 212 via the first optical waveguide 224. The second 1×2 bi-directional coupler 220 receives a light signal via a slow (e.g., horizontal) axis of the second optical fiber 212 and outputs a light signal via a fast (e.g., vertical) axis of the second optical fiber 212.

The modulator module 270 further includes an optical modulator 230 (e.g., a 1×2 directional coupler modulator, a silicon micro resonator optical modulator, or any other optical modulator that produces an output signal that can be redirected to the non-cryogenic environment 211) in the cryogenic environment 121. Thus, this redirected output signal is not dissipated into the cryogenic environment 121. The optical modulator 230 is coupled to the second optical waveguide 222, a third optical waveguide 234 (e.g., a 180 degrees turn waveguide), and a fourth optical waveguide 232. The optical modulator 230 receives the light signal from the second 1×2 directional coupler 220 via the second optical waveguide 222. The optical modulator 230 modulates this received light signal to produce the first modulated light signal and a second modulated light signal. The optical modulator 230 outputs the second modulated light signal to a cryogenic device 290, e.g., a cryogenic computing system, within the cryogenic environment 221 that is coupled to the optical modulator 230 via the fourth optical waveguide 232. In another example, the cryogenic device 290 is part of a cryogenic system (not shown) that provides a communication path within the cryogenic environment 221 and/or conveys signals from within the cryogenic environment 221 to the non-cryogenic environment 211. The fourth optical waveguide 232 is coupled to a third optical fiber 238 to provide a data path between the optical modulator 230 and the cryogenic device 290 for the second modulated light signal. The modulator module 270 further includes a polarization rotator 240 that is coupled to the third optical waveguide 234 and the fifth optical waveguide 236. The optical modulator 230 also outputs the first modulated light signal to the polarization rotator 240 via the third optical waveguide 234. The optical modulator 230 provides two "pseudo-complimentary" optical outputs in which substantially no light is wasted into the substrate of the modulator module 270 and which can be read out via the fourth optical waveguide 232 and the third optical fiber 238.

The polarization rotator 240 is an optical device that rotates the polarization axis of a linearly polarized light beam by an angle of choice. In this example, the polarization rotator 240 is a 90 degrees polarization rotator and can be integrated optically with the third optical waveguide 234 and the fifth optical waveguide 236. The polarization rotator 240 receives the first modulated light signal from the optical modulator 230 via the third optical waveguide 234, rotates a polarization axis of the first modulated light signal by about 90 degrees (e.g., within a 5% tolerance), and outputs the polarization axis rotated version of the first modulated light signal to the second 1×2 directional coupler 220. The polarization rotator 240 outputs the rotated version of the first modulated light signal on the fifth optical waveguide 236 to a fast axis (e.g., a vertical axis) of the second 1×2 directional coupler 220. Thus, the system 200 redirects one of the outputs of the optical modulator 230, the first modulated light signal on the third optical waveguide 234, from the cryogenic environment 121 to the non-cryogenic environment 211 to prevent the first modulated light signal from increasing a temperature of the cryogenic environment 121. Moreover, the system 200 eliminates the need for a second fiber at the output of the second optical device 220 and the associated complexity (e.g., mass, connectors, space, etc.), with the example system 200 redirecting one of the two outputs from the optical modulator 230 of the system 200 without affecting performance of the optical modulator 230.

Furthermore, the second optical device 220, the optical modulator 230, and their associated waveguides 222, 224, 232, 234, and 236 are integrated onto a same substrate, resulting in a diminished loss of light as it moves between such components such that nearly all of the first modulated light signal can be redirected into the non-cryogenic environment 211.

Figure 3:
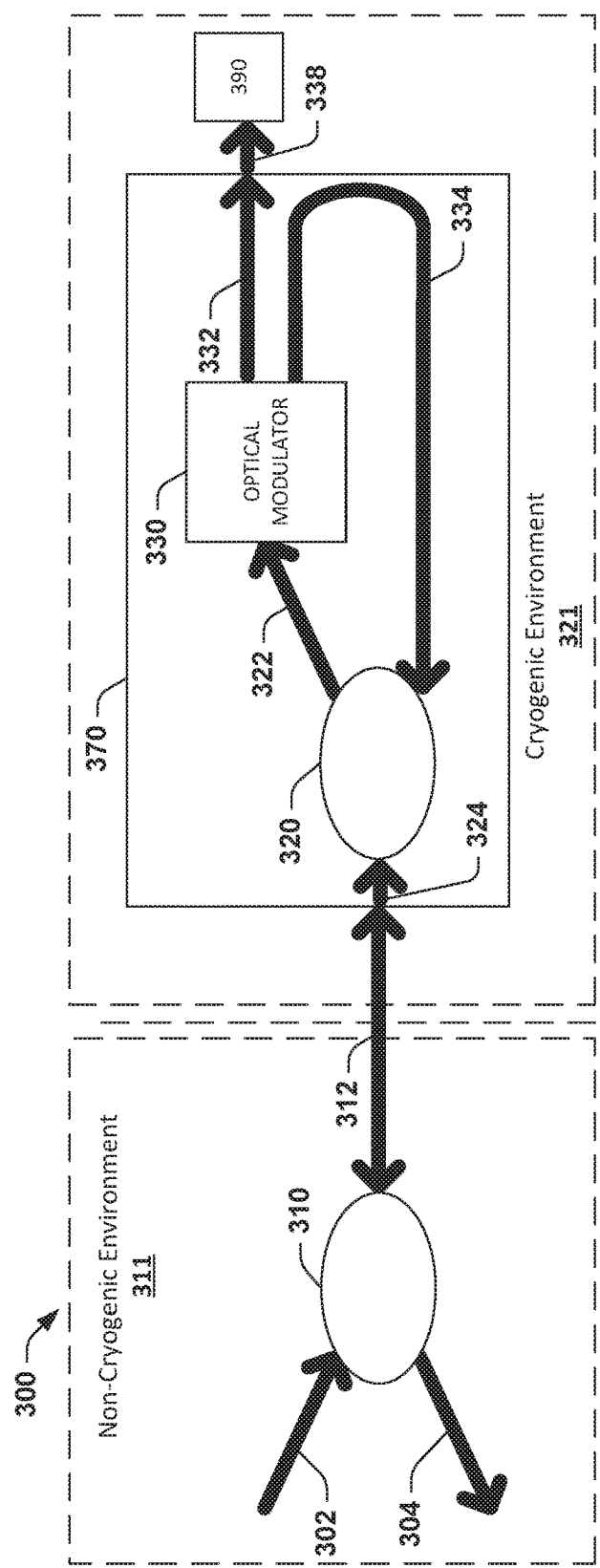
FIG. 3 illustrates yet another example system to redirect unused light from the cryogenic environment to the non-cryogenic environment.

FIG. 3 illustrates yet another example system 300 (e.g., ultra-low power electro-optic cryo-logic system) to redirect unused light from a cryogenic environment 321 to a non-cryogenic environment 311. The system 300 includes a first optical circulator 310 (e.g., an on-chip integrated optical circulator) in the non-cryogenic environment 311. The first optical circulator 310 is coupled to a first optical fiber 302, a second optical fiber 312 (e.g., a polarization maintaining fiber), and a third optical fiber 304 (e.g., a fast axis). The first optical circulator 310 receives a light signal on a slow axis of the first optical fiber 302 and outputs the light signal on a second optical fiber 312. The second optical fiber 312 is a polarization-maintaining (PM) fiber and carries polarized continuous wave (CW) light along its slow (e.g., horizontal) axis. The first optical circulator 310 further receives a first modulated light signal on the second optical fiber 312 and outputs the first modulated light signal into the non-cryogenic environment 311 via the third optical fiber 304. Thus, the second optical fiber 312 is a bi-directional path utilized to transport the light signal into the cryogenic environment 321 from the non-cryogenic environment 311, and the first modulated light signal into the non-cryogenic environment 311 from the cryogenic environment 321, with the light signal being transported into the cryogenic environment 321 on a slow axis of the second optical fiber 312 and the first modulated light signal being transported on a fast axis of the second optical fiber 312.

In an example, the first optical fiber 302 is a slow axis light path and the third optical fiber 304 is a fast axis light path. However, depending upon optical properties, e.g., a reflective index of a birefringent material (e.g., silica, fluorozirconate, fluoroaluminate, chalcogenide glasses, sapphire, polystyrene, acrylic, or any other electro-optical material) of the first optical fiber 302 and the third optical fiber 304, in another example the first optical fiber 302 can be a fast axis light path and the third optical fiber 304 can be a slow axis light path. The second optical fiber 312 is both a slow axis light path and a fast axis light path, with the second optical fiber 312 providing the slow axis light path from the non-cryogenic environment 311 to the cryogenic environment 321 and providing the fast axis light path from the cryogenic environment 321 to the non-cryogenic environment 311. Likewise, in another example the second optical fiber 312 can provide a fast axis light path from the non-cryogenic environment 311 to the cryogenic environment 321 and can provide a slow axis light path from the cryogenic environment 321 to the non-cryogenic environment 311.

The system 300 further includes a modulator module 370 that is comprised of a second optical circulator 320 (e.g., an on-chip integrated optical circulator) in the cryogenic environment 321. The first and second optical circulators 310 and 320 act as polarization-based multiplexers/demultiplexers in that they are bi-directional devices and are used to simultaneously split the light from an input fiber according to its polarization states (i.e., into vertical and horizontal) and combine two orthogonally-polarized beams into a single, dual polarization beam. In the example of FIG. 3 the first and second optical circulators 310 and 320 are polarized along a slow axis of the system 300 which lies along the horizontal direction.

The second optical circulator 320 receives the light signal from the first optical circulator 310 via the second optical fiber 312. The second optical circulator 320 is coupled to the second optical fiber 312 via a first optical waveguide 324, and is further coupled to a second optical waveguide 322 (e.g., a slow axis) and a third optical waveguide 334 (e.g., a 180 degrees turn waveguide). The second optical circulator 320 outputs the light signal on a second optical waveguide 322. The second optical circulator 320 also receives the first modulated light signal via the third optical waveguide 334 and outputs the first modulated light signal on the second optical fiber 312 via the first optical waveguide 324. The second optical circulator 320 receives a light signal via a slow (e.g., horizontal) axis of the second optical fiber 312 and outputs a light signal via a fast (e.g., vertical) axis of the second optical fiber 312.

The modulator module 370 further includes an optical modulator 330 (e.g., a 1×2 directional coupler modulator, a silicon micro resonator, or any other optical modulator that produces an output signal that can be redirected to the non-cryogenic environment 311) in the cryogenic environment 321. Thus, this redirected output signal is not dissipated into the cryogenic environment 321. The optical modulator 330 is coupled to a second optical waveguide 322, a fifth optical fiber 332, and a third optical waveguide 334. In an example, the optical modulator 330 is implemented on a same integrated circuit chip as the second optical circulator 320. The optical modulator 330 receives the light signal from the second optical circulator 320 via the second optical waveguide 322. The optical modulator 330 modulates this received light signal to produce the first modulated light signal and a second modulated light signal. The optical modulator 330 outputs the second modulated light signal to a cryogenic device 390, e.g., a cryogenic computing system, within the cryogenic environment 321 that is coupled to the optical modulator 330 via the fifth optical fiber 332. In another example, the cryogenic device 390 is part of a cryogenic system (not shown) that provides a communication path within the cryogenic environment 321 and/or conveys signals from within the cryogenic environment 321 to the non-cryogenic environment 311. The fifth optical waveguide 332 is coupled to a fourth optical fiber 338 to provide a data path between the optical modulator 330 and the cryogenic device 390 for the second modulated light signal. The optical modulator 230 also outputs the first modulated light signal to the second optical circulator 320 via the third optical waveguide 334. The optical modulator 330 provides two "pseudo-complimentary" optical outputs in which substantially no light is wasted into the substrate of the modulator module 370 and which can be read out via the fifth optical waveguide 332 and the fourth optical fiber 338.

Thus, the system 300 redirects one of the outputs of the optical modulator 330, the first modulated light signal on the third optical waveguide 334, from the cryogenic environment 321 to the non-cryogenic environment 311 where the first modulated light signal will not increase a temperature of the cryogenic environment 321. In particular, the second optical circulator 320 receives the first modulated light signal and outputs the first modulated light signal on the second optical fiber 312 on which the first modulated light signal will pass to the non-cryogenic environment 311. Thereafter, the first optical circulators 310 outputs the first modulated light signal into the non-cryogenic environment 311 to prevent the first modulated light signal from increasing a temperature of the cryogenic environment 321. Moreover, the system 300 eliminates the need for a second fiber at the output of the second optical circulator 320 and the associated complexity (e.g., mass, connectors, space, etc.), with the example system 300 redirecting one of the two outputs from the optical modulator 330 of the system 300 without affecting performance of the optical modulator 330. Furthermore, the second optical circulator 320, the optical modulator 330, and their associated waveguides 322, 324, 332, and 334 are integrated onto a same substrate, resulting in a diminished loss of light as it moves between such components such that nearly all of the first modulated light signal can be redirected into the non-cryogenic environment 311.

Figures 4A, 4B:
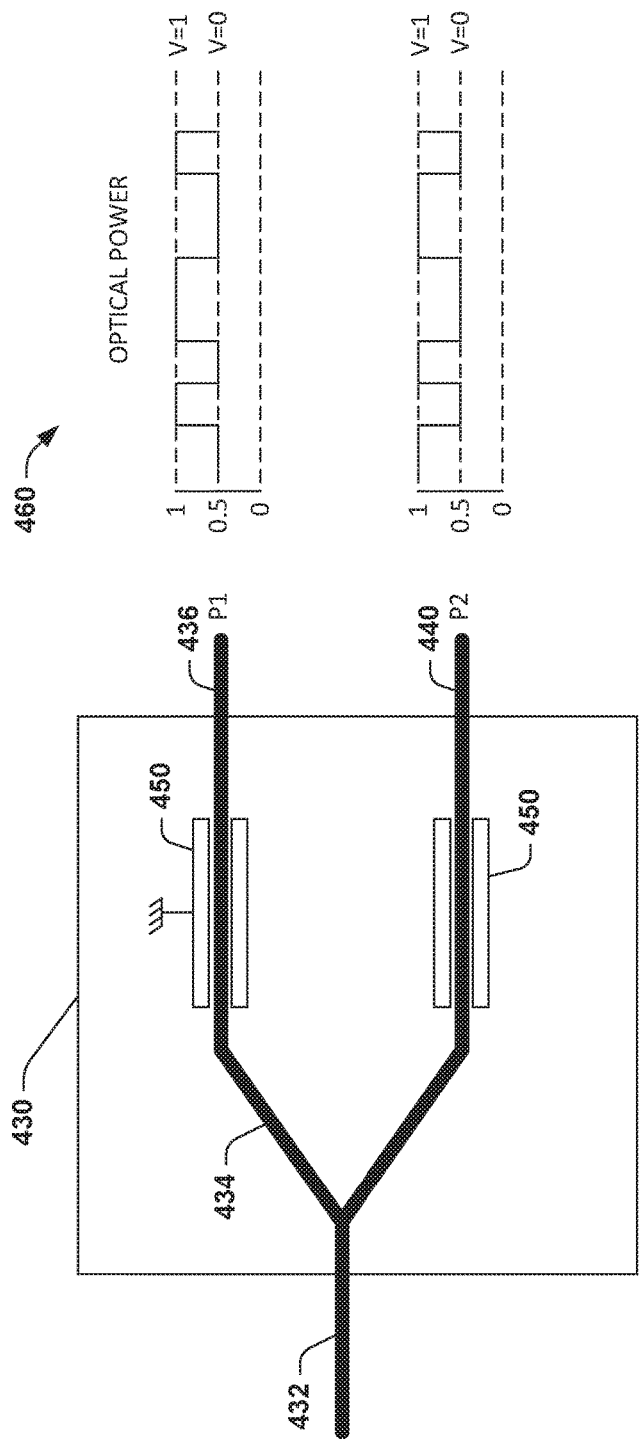
FIG. 4A illustrates an example schematic of an optical modulator.
FIG. 4B illustrates an example optical power timing diagram for the optical modulator 430 illustrated in FIG. 4A.

FIG. 4A illustrates an example schematic of an optical modulator 430 (e.g., a 1×2 directional coupler modulator). In an example, the optical modulator 430 can be used as the optical modulator 130, the optical modulator 230, and/or the optical modulator 330 illustrated in FIGS. 1-3, respectively.

The optical modulator 430 includes a single input, e.g., a single mode waveguide input 432. In an example, the optical modulator 430 is implemented on an electro-optics (EO) material, such as an organic EO material, a plastic EO material, or a polymer EO material, consisting of nonlinear optical chromophores in a polymer lattice. The single mode waveguide 432 branches at a waveguide "Y" 434 coupled to a directional coupler that includes two substantially identical parallel, single mode coupled waveguides 436 and 440. In an example, this waveguide "Y" is a slow axis polarization waveguide. Electrodes 450 are disposed parallel to the two substantially identical parallel, single mode coupled waveguides 436 and 440. In an example, the two substantially parallel, single mode coupled waveguides 436 and 440 are coupled waveguides in that a voltage signal is applied to the electrodes 450 to control the optical power P1 and P2 of the two substantially parallel, single mode coupled waveguides 436 and 440, respectively, of the optical modulator 430.

FIG. 4B illustrates an example optical power timing diagram 460 for the optical modulator 430 illustrated in FIG. 4A. In particular, with zero input voltage (V=0) being applied to the electrodes 450, light coupled into the single mode waveguide 432 splits evenly between the two substantially identical parallel, single mode coupled waveguides 436 and 440. In the case illustrated in FIG. 4B, the output optical power is P1=P2=0.5. When a value of one input voltage (V=1) is applied to the electrodes 450, a phase mismatch between the two substantially identical parallel, single mode coupled waveguides 436 and 440 is introduced, eliminating symmetry within the optical modulator 430 and causing unequal splitting of light at the two single mode coupled waveguides 436 and 440. Depending on the design of the optical modulator 430, one output (e.g., single mode coupled waveguide 436) will be high (optical power=1) and the other output (e.g., single mode coupled waveguide 440) will be low (optical power=0). In the example of FIG. 4B, when V=1 is applied to the electrodes 450 the optical power P1 at the single mode coupled waveguide 436 is P1=1 whereas at the same time the optical power P2 at single mode coupled waveguide 440 is P2=0. In the example illustrated, the optical modulator 430 produces a first modulated light signal at optical power P1 that is a complement of the second modulated light signal at optical power P2 produced by the optical modulator 430.

Figure 5:
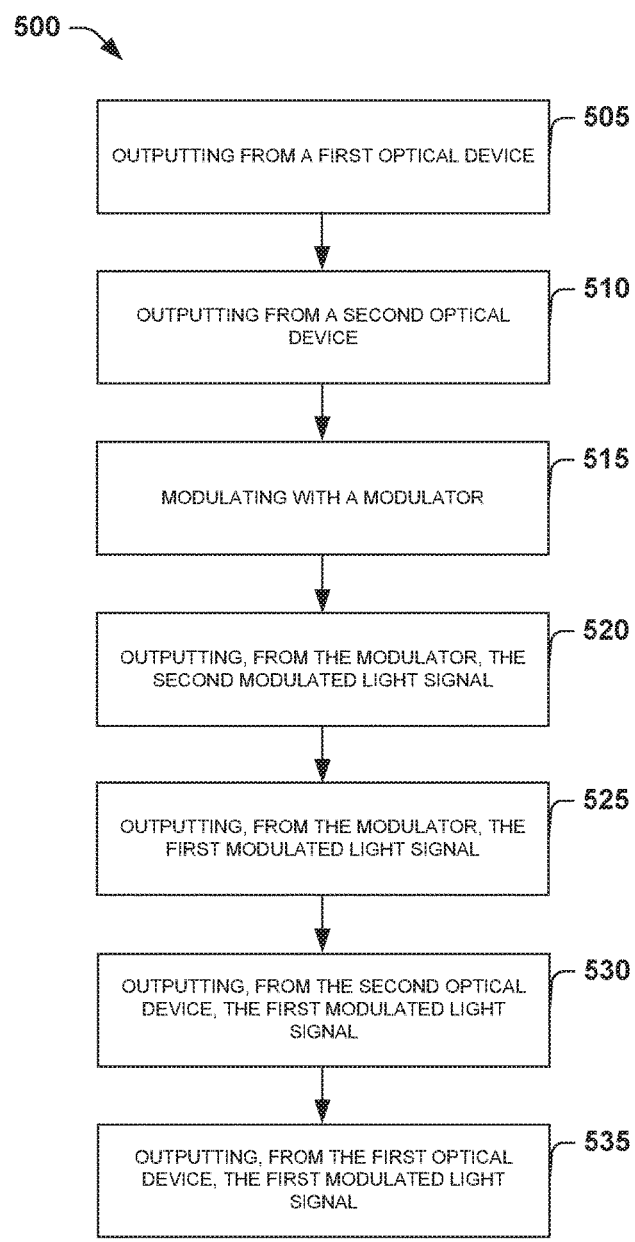
FIG. 5 illustrates an example method of redirect unused light from a cryogenic environment to a non-cryogenic environment.

In view of the foregoing structural and functional features described above, a method in accordance with various aspects of the present disclosure will be better appreciated with reference to FIG. 5. While, for purposes of simplicity of explanation, the method of FIG. 5 is shown and described as executing serially, it is to be understood and appreciated that the present disclosure is not limited by the illustrated order, as some aspects may, in accordance with the present disclosure, occur in different orders and/or concurrently with other aspects from that shown and described herein. Moreover, not all illustrated features may be required to implement a method in accordance with an aspect of the present disclosure. Additionally, the method of FIG. 5 may include additional features as described above for the components described in FIGS. 1-4.

FIG. 5 illustrates an example method 500 of redirect unused light from the cryogenic environment 121, 221, or 321 to the non-cryogenic environment 111, 211, or 311. This redirected unused light is not dissipated into the cryogenic environment 121, 221, or 321. At 505, the method 500 includes outputting, from a first optical device (e.g., the first optical device 110 of FIG. 1, the first 1×2 directional coupler 210 of FIG. 2, and first optical circulator 310 of FIG. 3) in a non-cryogenic environment 111, 211, or 311, a light signal to a second optical device (e.g., the second optical device 120 of FIG. 1, the second 1×2 directional coupler 220 of FIG. 2, and second optical circulator 320 of FIG. 3) in the cryogenic environment 121, 221, or 321. At 510, the method 500 further includes outputting, from the second optical device, the light signal to an optical modulator (e.g., optical modulator 130 of FIG. 1, optical modulator 230 of FIG. 2, and optical modulator 330 of FIG. 3) in the cryogenic environment 121, 221, or 321.

At 515, the method 500 even further includes modulating, with the optical modulator, the light signal to produce a first modulated light signal and a second modulated light signal. At 520, the method 500 further includes outputting, from the optical modulator, the second modulated light signal. At 525, the method 500 yet further includes outputting, from the optical modulator, the first modulated light signal to the second optical device.

At 530, the method even further includes outputting, from the second optical device, the first modulated light signal to the first optical device. At 535, the method 500 yet further includes outputting, from the first optical device, the first modulated light signal into the non-cryogenic environment 111, 211, or 311.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A system, comprising:
a first optical device, in a non-cryogenic environment, to receive a light signal, output the light signal, receive a first modulated light signal, and output the first modulated light signal into the non-cryogenic environment;
a second optical device, in a cryogenic environment, to receive the light signal from the first optical device, output the light signal, receive the first modulated light signal, and output the first modulated light signal; and
an optical modulator, in the cryogenic environment, to receive the light signal from the second optical device, modulate the light signal to produce the first modulated light signal and a second modulated light signal, output the second modulated light signal to a cryogenic computing device positioned within the cryogenic environment to establish a data path between the optical modulator and the cryogenic computing device, and output the first modulated light signal to the second optical device.

2. The system of claim 1, wherein the optical modulator is one of a 1×2 directional coupler modulator and a silicon micro resonator integrated optical modulator.

3. The system of claim 1, wherein the first optical device and the second optical device are optical polarization beam splitters and combiners.

4. The system of claim 1, wherein the first optical device and the second optical device are optical circulators.

5. The system of claim 1, further comprising a rotator to rotate a polarization axis of the first modulated light signal by about ninety degrees and output the polarization axis rotated version of the first modulated light signal to the second optical device.

6. The system of claim 5, further comprising a fast axis polarization waveguide to couple the rotator and the second optical device.

7. The system of claim 1, further comprising:
a one-hundred and eighty degrees turn waveguide coupled to the optical modulator to receive the first modulated light signal from the optical modulator and output the first modulated light signal to one of the second optical device; and
a rotator to rotate a polarization axis of the first modulated light signal by about ninety degrees.

8. The system of claim 1, wherein the first modulated light signal output from the optical modulator is a complement of the second modulated light signal output from the optical modulator.

9. A method, comprising:
outputting, from a first optical device in a non-cryogenic environment, a light signal to a second optical device in a cryogenic environment;
outputting, from the second optical device, the light signal to an optical modulator in the cryogenic environment;
modulating, with the optical modulator, the light signal to produce a first modulated light signal and a second modulated light signal;
outputting, from the optical modulator, the second modulated light signal to a cryogenic computing device positioned within the cryogenic environment to establish a data path between the optical modulator and the cryogenic computing device;
outputting, from the optical modulator, the first modulated light signal to the second optical device;
outputting, from the second optical device, the first modulated light signal to the first optical device; and
outputting, from the first optical device, the first modulated light signal into the non-cryogenic environment.

10. The method of claim 9, wherein the optical modulator is one of a 1×2 directional coupler modulator and a silicon micro resonator integrated optical modulator.

11. The method of claim 9, wherein the first optical device and the second optical device are optical polarization beam splitters and combiners.

12. The method of claim 9, wherein the first optical device and the second optical device are optical circulators.

13. The method of claim 9, further comprising:
rotating, with the rotator, a polarization axis of the first modulated light signal by about ninety degrees.

14. The method of claim 13, further comprising coupling the rotator and the second optical device via a fast axis polarization waveguide.

15. The method of claim 9, further comprising receiving, by a one-hundred and eighty degrees turn waveguide coupled to the optical modulator, the first modulated light signal from the optical modulator.

16. The system of claim 9, wherein the first modulated light signal output from the optical modulator is a complement of the second modulated light signal output from the optical modulator.

17. A system, comprising;
a first optical polarization beam splitter and combiner, in a non-cryogenic environment, to receive a light signal, output the light signal, receive a first modulated light signal, and output the first modulated light signal into the non-cryogenic environment;
a second optical polarization beam splitter and combiner, in a cryogenic environment, to receive the light signal from the first optical polarization beam splitter and combiner, output the light signal, receive the first modulated light signal, and output the first modulated light signal;
a 1×2 directional coupler modulator, in the cryogenic environment, to output a second modulated light signal and output a first modulated light signal to the second optical polarization beam splitter and combiner; and
a waveguide coupled to the directional coupler modulator to receive the first modulated light signal from the directional coupler modulator.

18. The system of claim 17, further comprising a rotator to output a polarization axis rotated version of the first modulated light signal to the second optical device.

19. The system of claim 18, further comprising a fast axis polarization waveguide to couple the rotator and the second optical polarization beam splitter and combiner.

20. The system of claim 17, wherein the first modulated light signal output from the 1×2 directional coupler modulator is a complement of the second modulated light signal output from the 1×2 directional coupler modulator.

* * * * *